United States Patent [19]
Miller et al.

[11] Patent Number: 5,277,031
[45] Date of Patent: Jan. 11, 1994

[54] METHOD AND APPARATUS FOR COOLING PRODUCE

[75] Inventors: Floyd E. Miller; Craig A. Miller, both of Fremont, Calif.

[73] Assignee: Western Precooling Systems, Fremont, Calif.

[21] Appl. No.: 799,567

[22] Filed: Nov. 27, 1991

[51] Int. Cl.[5] .................................. F25B 19/00
[52] U.S. Cl. .................................. 62/100; 62/170
[58] Field of Search ................ 62/268, 100, 170; 34/51

[56] References Cited

U.S. PATENT DOCUMENTS

| | | | |
|---|---|---|---|
| 4,204,408 | 5/1980 | Dawson | 62/170 |
| 4,576,014 | 3/1986 | Miller | 62/268 |
| 4,615,178 | 10/1986 | Badenhop | 62/169 |

Primary Examiner—William E. Wayner
Attorney, Agent, or Firm—Limbach & Limbach

[57] ABSTRACT

A vacuum cooling system is provided with controls for reliably and consistently controlling the cooling system for a chamber that holds produce provided with a vacuum pump, a refrigeration system, a vent valve, a bleed valve, first, second and third pressure detectors or pressure set points and a programmable logic controller for starting the pump and then automatically operating the refrigeration system in response to operation of the first pressure detector and then momentarily and repeatedly opening the bleed valve in response to operation of the second detector and wherein the third detector detects a pressure above the second level detector and the control system closes the bleed valve in response to operation of the third pressure detector.

10 Claims, 2 Drawing Sheets

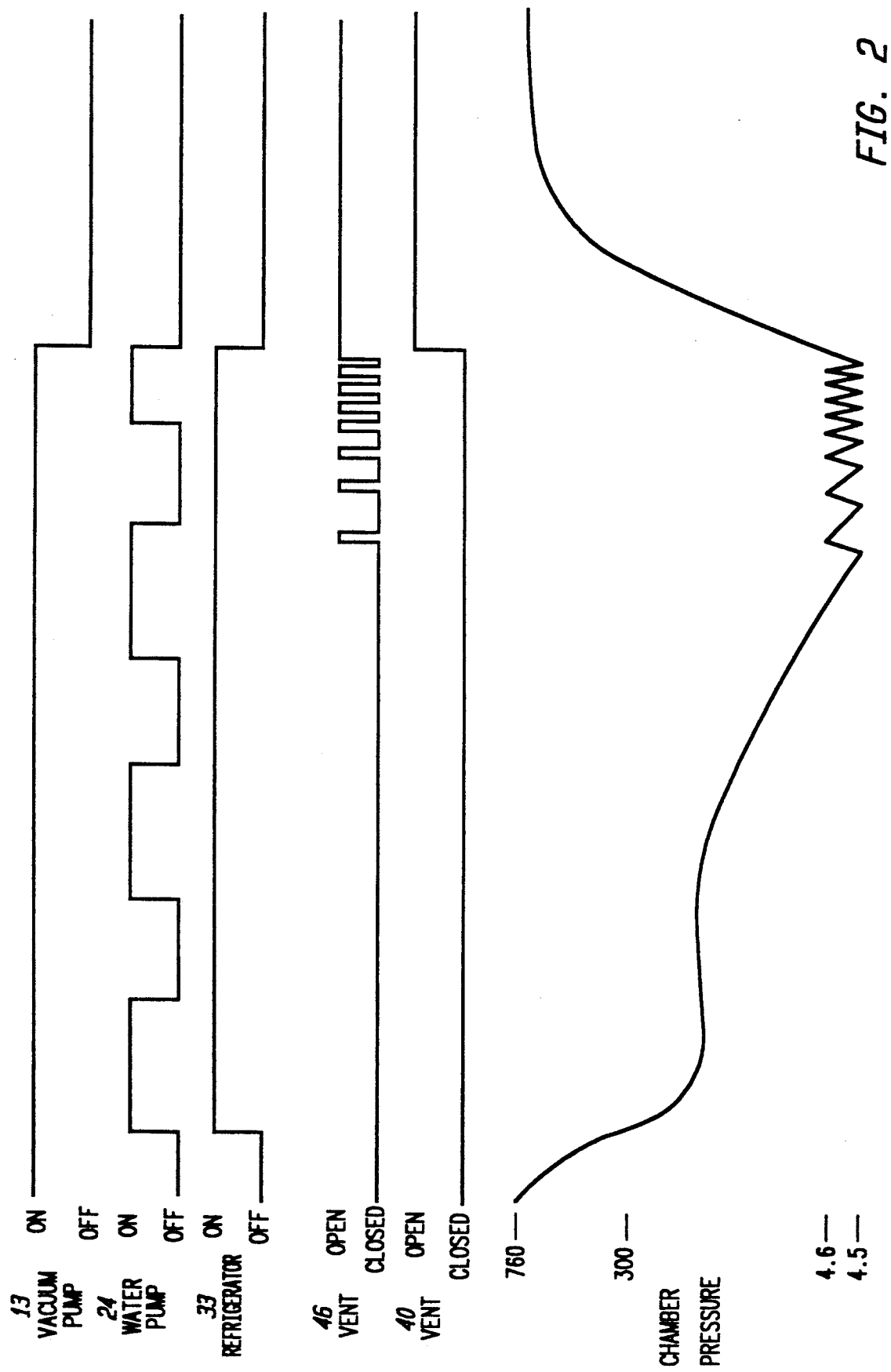

METHOD AND APPARATUS FOR COOLING PRODUCE

BACKGROUND OF THE INVENTION

This invention relates to cooling of produce to remove field heat from harvested crops such as lettuce, celery, mixed leaf lettuce, spinach, cabbage, and cauliflower. The invention is preferably used in connection with cooling equipment provided by Western Precooling Systems under the trademark Hydro Vac and illustrated in U.S. Pat. Nos. 3,844,132 and 4,576,014. It is envisioned that this equipment will also be used to vacuum cool products other than produce, such as turkeys or sod, that would not use the water spray of the Hydro Vac system.

In this equipment, freshly harvested produce (or other product) is placed in a vacuum chamber equipped with a vacuum pump, vacuum and temperature control instruments and gages, a refrigeration system having a cooling coil inside the chamber for condensing water evaporated from the produce and a spray system for spraying water on the produce. The produce is cooled by evaporation of water from the produce and by conduction of heat from the produce to the condensed water. A restricted vent is provided into the chamber for re-pressurizing the chamber at a controlled rate after cooling so that water on the produce is not forced into the cells of the produce to damage the produce. The heat removed from the produce is removed from the chamber by the refrigeration coils which condense water vapor and cool the air and water in the chamber.

Operation of the vacuum pump in the system can be started and stopped by totally starting or stopping a pump or by opening and closing a butterfly valve between the pump and chamber, and similarly, operation of the refrigeration system can be started and stopped by totally starting and stopping the system or by opening and closing a valve in an ammonia refrigerant line. The cooling system has been manually controlled with the operator:

a—starting the vacuum pump,
b—then starting the Hydro Vac water circulation pump which may be operated or not and for different times depending on the different produce (where water spraying is used, it is usually desirable to start water spraying at a pressure, for instance about 300 millimeters of mercury, above that at which water flashing vaporization starts so that the produce is wet and does not lose its own water when flashing starts),
c—then starting the refrigeration system after the vacuum gauge stops falling indicating that water in the produce has started flashing (this occurs at a pressure of about 15 to 20 millimeters of mercury depending of produce field temperature, 15 mm for 75 degrees F. and 20 mm for 100 degrees F.),
d—then monitoring wet bulb or internal product temperature probes or the vacuum gauge to determine when the surface temperature of the produce reaches about 33 degrees F. and stopping further cooling by first stopping the ammonia supply to the cooling coil in the refrigeration system, then closing the vacuum butterfly valve if necessary, and then flicking the vent valve open and closed quickly if necessary,
e—then restarting the refrigeration and pump if the temperature and pressure in the chamber rise, and
f—finally when the entire load of produce has been cooled to about 33 degrees F. as indicated by the temperature probe in the produce, the process is stopped by stopping the vacuum pump and refrigeration, venting the chamber and removing the produce.

Operation of the Hydro Vac equipment in this way has been very successful, but operator inattention to the equipment has reduced throughput of product and on occasion produced inconsistent results, or even freezing of the product, thereby ruining the product.

SUMMARY OF INVENTION

In accordance with this invention a method and apparatus is provided whereby automatic operation of produce cooling is obtained with consistent and efficient results. This is accomplished by automatically detecting two vacuum levels in the chamber, the first selected to start operation of the refrigeration system, and the water spray system where it is used, and the second selected for opening a bleed valve momentarily and repetitively when the pressure in the chamber reaches approximately the freezing point. Automatic controls are provided for implementing these operations in response to the detected pressures, and in a preferred form of the invention the control system further includes means for automatically ending the cooling operation by stopping the vacuum pump and refrigeration system and venting the chamber in response to the frequency of operation of the bleed valve.

Preferably the system uses a multiple pressure control such as a Model 850-400-61 "Pressure Controller with Set Point" sold under the trademark INFICON, a programmable logic controller (PLC) such as Model FA2J, manufactured by IDEK, and an electrically operated bleed valve such as an Asco Red Hat Valve Model 803-0A17 which opens in response to one signal and closes in response to a second signal. This bleed valve has a relatively small opening compared to the normal vents used in the Hydro Vac or vacuum cooling systems where a main vent of about 200 cm may be used to re-compress the chamber in about twenty seconds and a vent of about 2.5 cm may be used for the restricted recompression described in the '014 patent, which takes about three to five minutes. The bleed valve is sufficiently large in relation to the capacity of the vacuum pump that the pressure in the chamber rises when the bleed is open. The preferred INFICON control provides pressure detection of three set points, the first at about 300 mm to start the ammonia pump in the refrigeration system and the Hydro Vac water recirculation pump, if applicable, the second at about 4.5 mm to open the bleed valve and the third at about 4.6 mm to close the bleed valve. This system is preferred because it gives positive control over both opening and closing of the bleed valve, but the control system can be operated with a bleed valve which is opened by an electrical pulse and closed by a spring.

Automatic termination of the cooling cycle is controlled in response to the frequency of operation of the bleed valve. This may be done by counting the number of times the bleed valve opens or the duration the bleed valve remains open between the second and third set points or preferably by determining when the time between cycles of the bleed valve becomes constant, all of which is an indirect measurement of the degree to which the temperature is equilibrated throughout the product.

Because temperature is difficult to accurately measure in a vacuum, and the temperature varies from one piece of produce to another in a cooling cycle, and even varies throughout a single piece of produce, the novel methods described above provide a way to accurately and repeatably determine when an entire load of produce has been sufficiently cooled. Thus, the control system permits complete automatic operation based on pressure detection to the point where the produce is in a static cooled condition where it can be held or manually processed further, and in the preferred method, the control system can also automatically ready the chamber to discharge one load and receive another. The control system allows the product to be held closer to the freezing point for faster cooling with less likelihood of freezing the product.

BRIEF DESCRIPTION OF THE DRAWINGS

In the accompanying drawing, FIG. 1 is a schematic drawing of the apparatus of the invention and FIG. 2 is a timing diagram illustrating the sequence of operation of the control system.

DETAILED DESCRIPTION OF THE DRAWINGS

Figure 1:
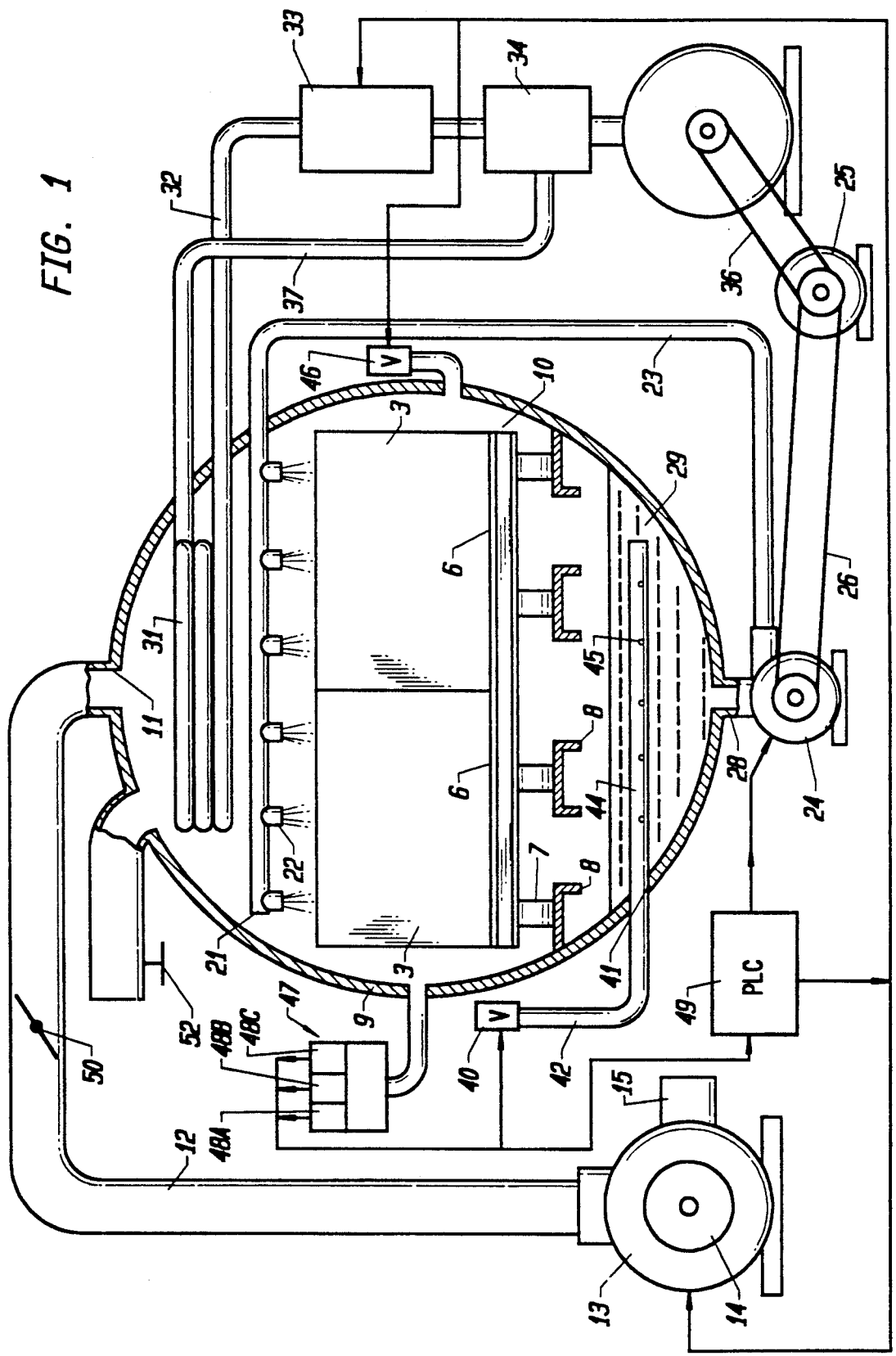

In the FIG. 1 is shown a typical produce cooler for removing field heat and for cooling produce such as lettuce, celery or the like as described in the '014 patent. The produce is placed in a container or carton 3 stacked on a cart 6 supported on wheels 7 positioned to run on rails 8 extending from the outside to the interior of a vacuum tube 9. Usually the produce is packed in ventilated cartons that are stacked on the carts 6 at a manageable height.

The vacuum tube forms a vacuum chamber 10 which receives the carts. The tube is formed of metal of sufficient strength to permit a substantial partial vacuum to be drawn in the chamber. Usually the chamber is provided with end doors (not shown) to allow the carts to be rolled in and out.

For evacuating the chamber 10 a duct 12 connects with an opening 11 in the vacuum tube and extends to a vacuum pump 13 driven by a motor 14 and having outlets 15 for discharging the evacuated air into the atmosphere. Thus the produce containers can be moved into the vacuum tube on the carts 6 and a partial vacuum drawn to cause evaporation of the moisture on the produce and thereby cool the produce as such evaporation takes place. For a further cooling effect there is positioned over the produce a water manifold 21 having a plurality of spray nozzles 22 for spraying water onto the produce. A pipe 23 connects with a pump 24 driven by an electric motor 25 connected by a belt 26. An inlet duct 28 connects with the pump 24 to supply water from a sump 29 in the bottom of the vacuum tube 9.

The water pump 24 pumps water through the pipe 23 and the manifold 21 to be sprayed out from the spray nozzles 22 onto the produce. This water flows downward over the produce and eventually flows by gravity back into the sump 29. In this manner this water is used to augment the vaporization process in absorbing field heat from the produce.

Additional cooling of the produce is achieved by cooling and condensing out the water and vapor and allowing the resulting cold condensed water to flow over the produce. For this purpose, a refrigerator coil 31 is suspended from the top of the vacuum tube 9 over the produce. The coil is supplied with a cold refrigerant through an inlet pipe 32 leading from a refrigerator mechanism 33. Connecting with this mechanism is a refrigeration compressor 34 which is also driven by the motor 25 by means of a drive belt 36. By pumping the refrigerant through the coil 31 heat is removed from the water vapor as it rises within the vacuum chamber and comes in contact with the coil. The vapor condenses into water droplets which fall by gravity over the produce and eventually flow into the sump 29. Naturally this water is cooled because of contact with the refrigerated coil and therefore tends to further remove heat from the produce. The warm refrigerant is returned from the coil through a pipe 37 connecting with the compressor 34.

From the foregoing it is apparent that the produce is cooled by evaporation of water, by a shower of water supplied through the nozzles from the sump and by cold condensate from water vapor that is cooled by contact with the refrigeration coils. Thus there is provided considerable contact of cool water with the produce which not only accelerates the heat transfer from the produce to the water, but also tends to deposit a layer of water on the produce so as to slow subsequent dehydration of the produce.

After the produce is cooled, a valve 40 is opened to allow air to flow from the outside atmosphere through an opening 41 in the vacuum tube for raising the atmospheric pressure within the vacuum chamber 10 to outside atmospheric level. This action is necessary before the chamber can be opened to allow the carts 6 to be rolled from the tube after the cooling process is finished.

Thus the produce is moved into the chamber, the doors are closed and sealed and a partial vacuum is drawn for evaporative cooling. At the same time pumps are started for spraying water over the produce and for circulating refrigerant through the cooling coils for condensing water from the vapor and allowing the cool water to flow over the produce. After the produce is sufficiently chilled by the removal of field heat, air is allowed to flow back into the vacuum chamber by the opening of the valve 40 to raise the internal pressure to the outside atmospheric level. Thereafter the doors can be opened for removal of the chilled produce and insertion of unchilled produce.

The pipe 42 extending from the valve 40 and through the opening 41 in the vacuum tube is connected to a manifold or outlet 44 which extends beneath the surface of the a water in the sump 29. The manifold has air openings 45 through which the air from the outside can bubble up through the water in the sump for pressurizing the vacuum chamber 10 above the water. By extending the manifold 44 substantially along the length of the vacuum tube the air is distributed throughout the tube thereby eliminating substantially all pressure differentials within the vacuum chamber. Such pressure differentials can result in a more rapid pressure rise in some areas of the vacuum tube thereby increasing the vacuum infiltration of water into the fruit. The quicker the pressure is raised around the fruit, on which moisture is deposited, the more likely that vacuum infiltration is to occur. By elimination of any rapid pressure rise in the vacuum chamber, such vacuum infiltration is lessened.

In accordance with this invention, an electrically operated bleed valve 46 such as the Asco Model 803-0417 valve mentioned above and a three set point pressure detector 47 such as the INFICON Model 850-400-61 controller are connected to the chamber by suitable conduits. Pressure detectors 48a, 48b and 48c three set points on the INFICON controller are set to about 300 mm, 4.5 mm and 4.6 mm. The signal outputs from the INFICON detector 47 or controller are input to a programmable logic controller (PLC) 49, such as the IDEK Model FA2J. This PLC is connected through relays to start pump 24 and refrigerator mechanism 33 in response to the pressure detected at the first set point, open the bleed valve 46 in response to the pressure detected at the second set point and close the bleed valve 46 in response to the pressure detected at the third set point.

The PLC is also connected through relays to vacuum pump motor 14 and vent 40 and can be used to control the entire vacuum cooling cycle. The PLC includes counters, timers, and other standard programming logic elements that can be programmed in a number of different ways to control the various phases of the cooling cycle. For instance, in one type of produce cooling cycle, the pump 24 turns on when the chamber pressure drops below the first set point and remains on for 3 minutes thereafter.

The end of the cooling cycle is determined from the bleed valve 46 signal. As the produce temperature reaches an equilibrium near 33° F., the frequency of actuation of bleed valve 46 increases due to less moisture being evaporated from the produce. The PLC utilizes an internal timer to determine when the actuation of bleed valve 46 stabilizes or reaches a preset time limit between actuations. Alternatively, an internal counter can be used to determine when the valve opens and closes a preset number of times. This signals the end of the cooling cycle and the chamber is automatically brought up to atmospheric pressure for removing the produce.

The operation of the system of the invention will be apparent from FIG. 2 in which a preferred sequence of operation of the components of the system is shown. When the vacuum pump 13 is initially started, the pressure in the chamber decreases until the controller 47 detects the chamber pressure reaching the first set point at 300 mm and the PLC starts the water pump 24 and refrigeration unit 33. Note that an adjustable timer cycles the water pump on and off. The chamber pressure continues to fall until water flashing starts when the pressure remains fairly steady and then starts down again. When the controller 47 detects the chamber pressure reaching the second set point at 4.5 mm, the PLC opens the bleed 46 and the pressure rises until the chamber pressure reaching the third set point is detected at 4.6 mm and the PLC closes the bleed valve 46. The bleed valve continues to cycle open and closed in this manner at an increasing frequency until a stable condition is reached at which time the PLC opens the vents 46 and 40 and stops the vacuum pump, the water pump, and the refrigeration unit 33 preparing the unit to discharge the produce and receive another load.

We claim:

1. Apparatus for cooling produce comprising:
    a chamber adapted to contain the produce to be cooled,
    a vacuum means connected to the chamber for pumping air out of the chamber,
    a refrigeration system having a cooling heat exchange coil communicating with the interior of the chamber for cooling fluid in the chamber,
    a vent valve for admitting air into the chamber,
    a bleed valve for admitting air into the chamber at a restricted rate,
    a first pressure detector for detecting a first vacuum level in the chamber below atmospheric pressure,
    a second pressure detector for detecting a second vacuum level in the chamber below the pressure of the first vacuum level, and
    control means for starting the pump and then automatically operating the refrigeration system in response to operation of the first pressure detector and then momentarily and repetitively opening the bleed valve in response to operation of the second detector.

2. The apparatus of claim 1 in which a third pressure detector is provided for detecting a pressure above the second vacuum level and the control system includes means for closing the bleed valve in response to operation of the third pressure detector.

3. The apparatus of claim 2 in which said third pressure detector detects a pressure of about 4.6 mm.

4. The apparatus of claim 1 in which said first pressure detector detects a pressure of about 300 to 15 mm and said second pressure detector detects a pressure of about 4.5 mm.

5. The apparatus of claim 1 characterized further in that the control means includes means for stopping both the refrigeration system and the vacuum means in response to the frequency of operation of the second detector.

6. The apparatus of claim 1 characterized further in that:
    said chamber includes means for discharging water in said chamber at a location above said produce to cause cool water to flow downwardly over the produce, and
    the control means includes means for stopping both the refrigeration system and the vacuum means and venting the chamber in response to the frequency of operation of the second detector.

7. The method of cooling produce comprising:
    confining the produce to be cooled in a chamber,
    connecting a vacuum means to the chamber for pumping air out of the chamber,
    connecting a refrigeration system to the chamber with a cooling heat exchange coil communicating with the interior of the chamber,
    providing a bleed valve and a vent valve for admitting air into the chamber,
    detecting a first vacuum level in the chamber below atmospheric pressure,
    detecting a second vacuum level in the chamber below the pressure of the first vacuum level, starting the vacuum means, and
    then automatically operating the refrigeration system in response to detecting the first vacuum level and then momentarily and repetitively opening the bleed valve in response to detecting the second vacuum level.

8. The method of claim 7 characterized further by the inclusion of the final step of stopping both the refrigeration system and the vacuum means in response to the frequency of operation of the second detector.

9. The method of claim 7 in which said first vacuum level detected is about 15 to 300 mm and said second vacuum level detected is about 4.5 mm.

10. The method of claim 7 characterized further by the inclusion of the steps of:
    discharging water in said chamber at a location above said produce to cause cool condensed water to flow downwardly over the produce, and
    stopping both the refrigeration system and the vacuum means and opening said vent in response to the frequency of operation of the second detector.

* * * * *